United States Patent
Kathpal et al.

(10) Patent No.: US 9,933,970 B2
(45) Date of Patent: Apr. 3, 2018

(54) DEDUPLICATING DATA FOR A DATA STORAGE SYSTEM USING SIMILARITY DETERMINATIONS

(71) Applicant: NetApp, Inc., Sunnyvale, CA (US)

(72) Inventors: Atish Kathpal, Bangalore (IN); Giridhar Yasa, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 129 days.

(21) Appl. No.: 14/928,848

(22) Filed: Oct. 30, 2015

(65) Prior Publication Data

US 2017/0123711 A1    May 4, 2017

(51) Int. Cl.
*G06F 12/00* (2006.01)
*G06F 3/06* (2006.01)

(52) U.S. Cl.
CPC .......... *G06F 3/0641* (2013.01); *G06F 3/0608* (2013.01); *G06F 3/0686* (2013.01)

(58) Field of Classification Search
CPC ...... G06F 3/064; G06F 3/0641; G06F 3/0674; G06F 12/00
USPC ......................................... 711/100, 111, 154
See application file for complete search history.

(56) References Cited

U.S. PATENT DOCUMENTS

| | | | |
|---|---|---|---|
| 9,448,739 B1* | 9/2016 | Nagarkar | G06F 11/1453 |
| 2013/0166862 A1* | 6/2013 | Huang | G06F 11/1451 |
| | | | 711/162 |
| 2015/0088837 A1* | 3/2015 | Nag | G06F 17/30312 |
| | | | 707/692 |
| 2015/0212749 A1 | 7/2015 | Kathpal et al. | |
| 2015/0227543 A1* | 8/2015 | Venkatesh | G06F 9/45533 |
| | | | 707/620 |

* cited by examiner

*Primary Examiner* — Tuan Thai
(74) *Attorney, Agent, or Firm* — Cooper Legal Group, LLC

(57) ABSTRACT

A method and system for deduplicating data for a data storage system using similarity determinations are described. A tape library is arranged in a hierarchy of tape groups and tape plexes. Tape groups are an admin visible entity and are comprised of multiple tape plexes (at least equal to the number of replicas in a tape group). Tape plexes in turn comprise multiple tape cartridges. Data files and objects received within a time period are initially staged in a disk cache where they are logically segregated into cliques based on their expected deduplication ratios. These cliques are then evaluated for the amount of duplication they have with data existing in tape plexes. Based on the number of replicas being written, the top few tape plexes are selected from within the tape group. The cliques are deduplicated with data on the selected tape plexes, compressed, and written to tape.

20 Claims, 7 Drawing Sheets

DEDUPLICATING DATA FOR A DATA STORAGE SYSTEM USING SIMILARITY DETERMINATIONS

TECHNICAL FIELD

Examples described herein relate to data storage, and more specifically, to deduplicating data for a data storage system using similarity determinations.

BACKGROUND

Robust data storage systems typically utilize multiple computing devices and different types of storage devices (e.g., hard disk drives, optical disk drives, solid state drives, or tape drives) to hold large amounts of data while also enabling high availability and resilience to hardware or other failures. Generally speaking, individual storage systems can be classified according to their latency and/or throughput. For example, a high speed storage system may use very fast hard disk drives, solid state drives, and caches to maximize throughput and minimize latency. However, employing fast storage devices can be prohibitively expensive for storing large amounts of data. A low speed storage system employs cheaper media types (e.g., slower hard disk drives, hard disk drives that conserve energy by powering down, tape drives, optical drives, etc.) to reduce costs, but they provide lower throughput and higher latency.

These low speed storage systems can also employ deduplication technology to increase the amount of data they can store in the same amount of storage space. Deduplication is a technique similar to compression for reducing or eliminating duplicate copies of data. As an example, when two files or objects share some common data, deduplication may store the common data only once. In some implementations, repeating clusters of data may be replaced with a small reference to the location where the repeated data is stored. This compression technique can be used to improve storage utilization and reduce network bandwidth usage.

Tape drives are another storage-efficient technology for low speed storage systems. An enterprise tape library apparatus is a data storage device that provides sequential storage of objects comprising items of data on different magnetic tapes. When a request for one of the objects is received, the corresponding magnetic tape is identified, loaded on one of the tape drives, and physically wound to read the object in the enterprise tape library apparatus. A tape drive provides sequential access storage, unlike hard disk drives or solid state drives that are designed to provide random access storage. A disk drive can move to any position on the disk in a few milliseconds, but a tape drive must physically wind tape between reels to read any one particular piece of data or write to a specific place. As a result, tape drives have very slow average seek times to data and are typically configured to write data sequentially.

DETAILED DESCRIPTION

Figure 1:
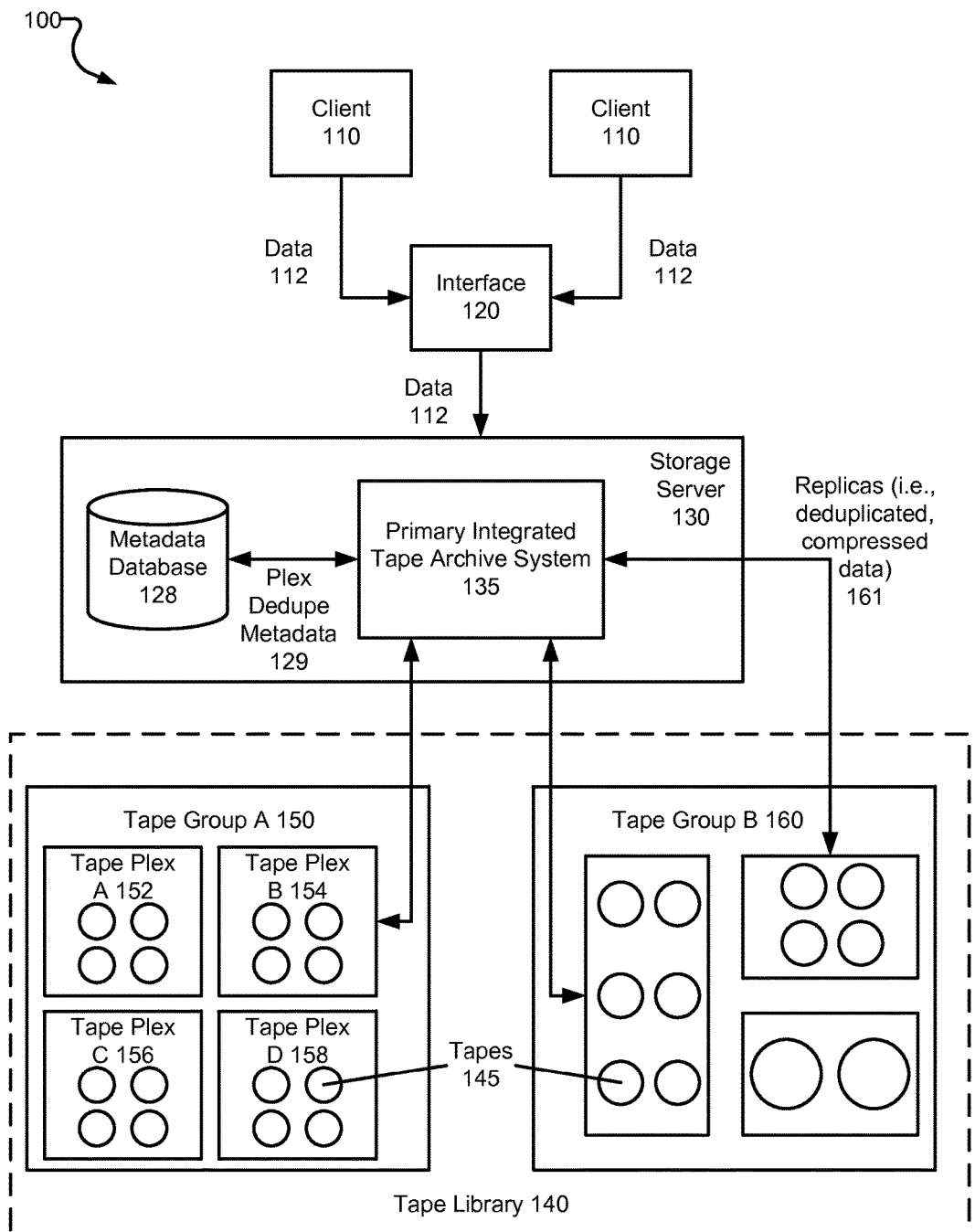
FIG. 1 illustrates an example system for restricted-deduplication assisted replication for reliability of data in tapes, in accordance with some aspects.

Well-separated classes of storage have emerged over the past few years, namely, performance-optimized and capacity-optimized. Owing to its better throughput and lower latencies, the former has seen heavy adoption of flash and solid state drives. Disks and tapes constitute the capacity class. Since the introduction of disks, tapes have been used primarily from a backup standpoint. However, new types of services have developed which can effectively utilize medium-throughput storage devices as well as other facets of storage devices, such as a high time to first byte. These types of services include cold storage offerings from cloud vendors as well as applications and workloads that deal with active archiving of logs and machine-generated data.

Examples recognize that for these types of services, which prioritize long-term retention, medium throughput, and low costs, tape drives can be a good fit. For example, tape drives typically are significantly less in cost per gigabyte as compared to disk storage. Moreover, tape drives have inherent capabilities that are not present in disk drives, such as tape partitions in Linear Tape-Open 5 (LTO-5) or self-describing formats such as the Linear Tape File System (LTFS), which can eliminate a need for back-up applications to provide for vendor-neutral formats. Media postproduction and archival vendors can use these new capabilities to integrate tape into their workflows.

Examples also recognize that backup and archive applications highly value long-term data reliability, which is a weakness for conventional tape devices. Storage-efficient protection of data in tapes is a challenge because tapes are not amenable to efficient forms of data reliability such as erasure coding and traditional RAID, and conventional data replication significantly increases storage costs. The problem in using traditional RAID and erasure codes is that in order to read a given cluster of data, these methods require loading multiple tapes, which is heavily constrained by the limited number of tape drives in a tape library. In addition, tapes have limited duty cycles often ranging from 5K to 20K.

Examples such as described replicate data clusters, or cliques, across tape plexes after deduplication and compression in order to minimize costs and overhead of data protection. Choosing to deduplicate data before replication reduces the storage footprint of replicated data, and since tapes have limited duty cycles, replicating data across tapes helps to balance read/write operations across a replication group. This gives replication an important benefit over RAID and erasure coding in tapes, which both require all subsets of a data cluster to be accessed every time in order to serve the original data cluster.

According to examples as described, a tape library is arranged in a hierarchy of tape groups and tape plexes. Tape groups are an admin visible entity and are comprised of multiple tape plexes (at least equal to the number of replicas in a tape group). Tape plexes in turn comprise multiple tape cartridges. Data files and objects received within a time period are initially staged in a disk cache where they are logically segregated into cliques based on their expected deduplication ratios. These cliques are then evaluated for the amount of duplication they have with data existing in tape plexes. Based on the number of replicas being written, the top few tape plexes are selected from within the tape group. The cliques are deduplicated with data on the selected tape plexes, compressed, and written to tape.

In storage systems that employ multiple data storage devices and/or media (e.g., tape cartridges or optical disks), deduplication can be applied to data stored on not just a single media element but across multiple media elements as well. However, changing media elements can increase latency considerably. For example, applying deduplication across several tape cartridges can improve storage utility, but this also means that data stored on a first tape cartridge may be referenced as part of a deduplication process applied to a second tape cartridge. As a result, when a file from the second tape cartridge is a deduplicated reference to data stored on the first tape cartridge, the tape drive must stop reading data from the second tape cartridge and then start reading data from the first tape cartridge. This change process can considerably increase latency and reduce throughput because tape cartridges may need to be removed, inserted, wound to the correct point on the tape, etc. In addition, if any one of the deduplicated tapes fails, data from the deduplicated group can be permanently lost. On the other hand, if deduplication is only applied on a per-media-element level, storage utility is worsened. Some examples take into consideration the number of available data storage devices to determine how many media elements can be used during deduplication. As an example, if a tape drive can read from four tapes concurrently, deduplication may be applied across three tape cartridges.

Among other benefits, examples as described can improve storage utility and maintain data reliability by analyzing data duplication and deduplicating received data with the most compatible tape plexes in the tape group. In various aspects, a storage system can make a replica of the received data for each of the selected tape plexes. Examples can also determine that some data stored across replicas should not be deduplicated because doing so would reduce data availability. For example, if two replicas are each stored on 6 tape cartridges (for a total of 12 tape cartridges), deduplication may be applied within each of the two 6-tape plexes, but not across all 12 tape cartridges. In some aspects, tape plexes may span across tape drives so that a tape plex has more tape cartridges than the maximum number of tape cartridges utilized by a tape drive. A further benefit of writing replicas to different tape plexes is that when reading data, any replica can be read from. The replica can be chosen based on which tapes have been used the least, thereby prolonging the life of the tapes.

Under conventional approaches, when a tape drive reads from a tape cartridge, it races at a high speed to a point on the tape where the data is expected to exist. If the tape drive overshoots the location, it rewinds the tape at a slower speed to reach the data. After locating and reading the data, the tape drive then races to the next location and likely overshoots that one as well. This back and forth tape motion is known as the shoeshine effect, which results in decreased throughput and reduction in tape life. When data is deduplicated, contiguity of the data is reduced because the references to previously stored data can refer to widely dispersed points on the tape, forcing the tape drive to wind and unwind more of the tape to read data. To reduce the shoeshine effect, a media element (e.g., a tape cartridge) can be divided into discrete partitions. In some examples, a partition is a specified number of adjacent or nearby tracks, blocks, or length of tape, and a window is a number of partitions. As another capability and benefit, examples as described include a tape system which is capable of deduplicating data only within the last window or last few windows so that the tape requires less movement to read back the deduplicated data.

Although some examples herein are described with reference to using tape cartridges, aspects of examples described can also be extended to other types of storage devices that include storage elements and operational characteristics that are similar to tape drives. More specifically, some examples described herein can include optical media and hard disk drives which have the ability to enter a low-power state when not in use. Additionally, some hard disk drives can have various power states from powered off, sleep/standby, low speed mode, and high speed mode. In a manner akin to changing tape cartridges, latency and throughput can be affected based on which power state a hard disk drive is in when data is written to (or read from) it and which power state is required. As an example, if the hard disk drive is in a sleep or standby mode and data is to be read quickly, the hard disk drive may take time to change power modes. In addition, aspects can also be applied to high speed storage systems to improve throughput of applications that access data sequentially. Also, aspects can be applied to file storage, object storage, or any other type of data storage. Thus, files and objects may be discussed interchangeably herein.

In various aspects, deduplication may be either fixed length or variable length. As an example, when a hash value is computed for data, the data can have a specified size (or "length") or may have variable length. This size can further be adjusted at configuration time or runtime.

According to one aspect, a data storage system receives data that is to be stored at the system. For a number of storage elements connected to the storage system, the storage system compares the data on each storage element with the received data to select which ones of the storage elements have the most similar data (i.e., how well the received data can deduplicate with the data already stored). The received data can then be deduplicated with the stored data for each of the selected storage elements and written.

In further aspects, the data storage system identifies patterns of bytes within the received data and separates the received data into one or more subsets, or cliques, based on the identified patterns of bytes. For each of the cliques, the data storage system determines a subset similarity between the subset and data stored on each of the storage elements at the data storage system, selects one or more of the storage elements based on the subset similarity, and writes the subset to the selected storage elements, including, for each of the selected storage elements, deduplicating the subset with the data stored on that storage element.

In one aspect, the subset similarity is determined by (i) applying a hashing algorithm to the subset to generate a subset fingerprint, and (ii) comparing the subset fingerprint to stored fingerprints corresponding to the data stored on each of the storage elements. The data storage system can also store the generated subset fingerprints in association with the selected storage elements.

Furthermore, the data storage system can copy the received data to create one or more replicas and write each replica to one of the selected storage elements, including, for each of the replicas, deduplicating the replica with the data stored on that storage element. In some examples, selecting the one or more storage elements comprises selecting the storage element with a highest similarity, and for each replica, selecting the storage element with a next highest similarity.

According to some aspects, the data stored on each of the plurality of storage elements are divided into windows based on how recently the data was stored, and similarity is only determined between the received data and data from a predetermined number of recent windows on each of the storage elements.

In some examples, each of the plurality of storage elements comprises multiple linear tape cartridges, or tape plexes.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates an example data storage system 100 for restricted-deduplication assisted replication for reliability of data in tapes, in accordance with some aspects. In some aspects, a primary integrated tape archive system 135 (PITA) is an archival storage system that comprises disks as a cache and tapes 145 as the medium of persistent storage. A tape library 140 can be arranged in a hierarchy of tape groups 150, 160 and tape plexes 152-158. Tape groups are an admin-visible entity and are comprised of multiple tape plexes (at least equal to the number of replicas in a tape group). Tape plexes in turn comprise multiple tapes 145 (also referred to as tape cartridges). Data 112 received within a time period are initially staged in a disk cache of a storage server 130. A primary integrated tape archive system 135 logically segregates data 112 into cliques based on expected deduplication ratios. The primary integrated tape archive system 135 can evaluate these cliques for the amount of duplication they have with data existing in tape plexes by using plex deduplication metadata 129 from a metadata database 128. Depending on the number of replicas 161 being written, the top few tape plexes 152-158 are selected from within the tape group 150, 160. The cliques are deduplicated with data on the selected tape plexes, compressed, and written to tapes 145 on the selected plexes.

In some examples, PITA 135 is exported as a whole through the Network File System (NFS) and/or a Representational State Transfer (REST) interface 120. Storage server 130 receives data 112 from clients 110 through the interface 120. Writes bound for tape library 140 are received by PITA 135, which updates the metadata database 128, commits the write to the disk-based cache, and sends the acknowledgment to the client 110. Offline, based on triggers such as the cache being too full, or after a fixed amount of time, the writes are flushed to tapes 145. During the task of flushing new objects to tapes, the objects are first segregated into deduplication groups, which are then packed into compression groups (CGs) and stored in tapes 145. Deduplication in PITA 135 is restricted to a tape 145 within a tape plex 152-158 (TP); that is, files within a TP can be deduplicated only against other files in the same TP. Objects are assigned to a TP based on optimal deduplicability (for reliability, a replica of that object is not stored on the same TP).

In some aspects, the tapes are formatted using the Linear Tape File System (LTFS) and are grouped together to form tape plexes 152-158, which serve as a boundary for the deduplication of data. In the example of FIG. 1, tape plex A 152, tape plex B 154, tape plex C 156, and tape plex D 158 each consist of four tapes 145. Since each plex serves as a boundary for deduplication, data stored on any of the four tapes in tape plex A 152 can be deduplicated with the other three tapes. However, data on those tapes 145 are not deduplicated with tapes 145 belonging to any other plex or group. In one aspect, the number of tapes 145 in a plex depends on the number of tape devices available to read and write to the tapes 145.

Multiple plexes are grouped together to form a tape group 150, 160 (TG), which is a single admin-visible entity that can be exposed through NFS or RESTful interface 120 to the clients 110. As replicas 161 of given data 112 are stored together within a tape group, tape groups thus serve as the data reliability boundary. In the example of FIG. 1, tape library 140 comprises two groups, tape group A 150 and tape group B 160. Since each group serves as the boundary for data reliability, replicas 161 written to tape group A 150 are distributed between tape plexes 152-158, but not to any of the plexes in tape group B 160.

Figure 2:
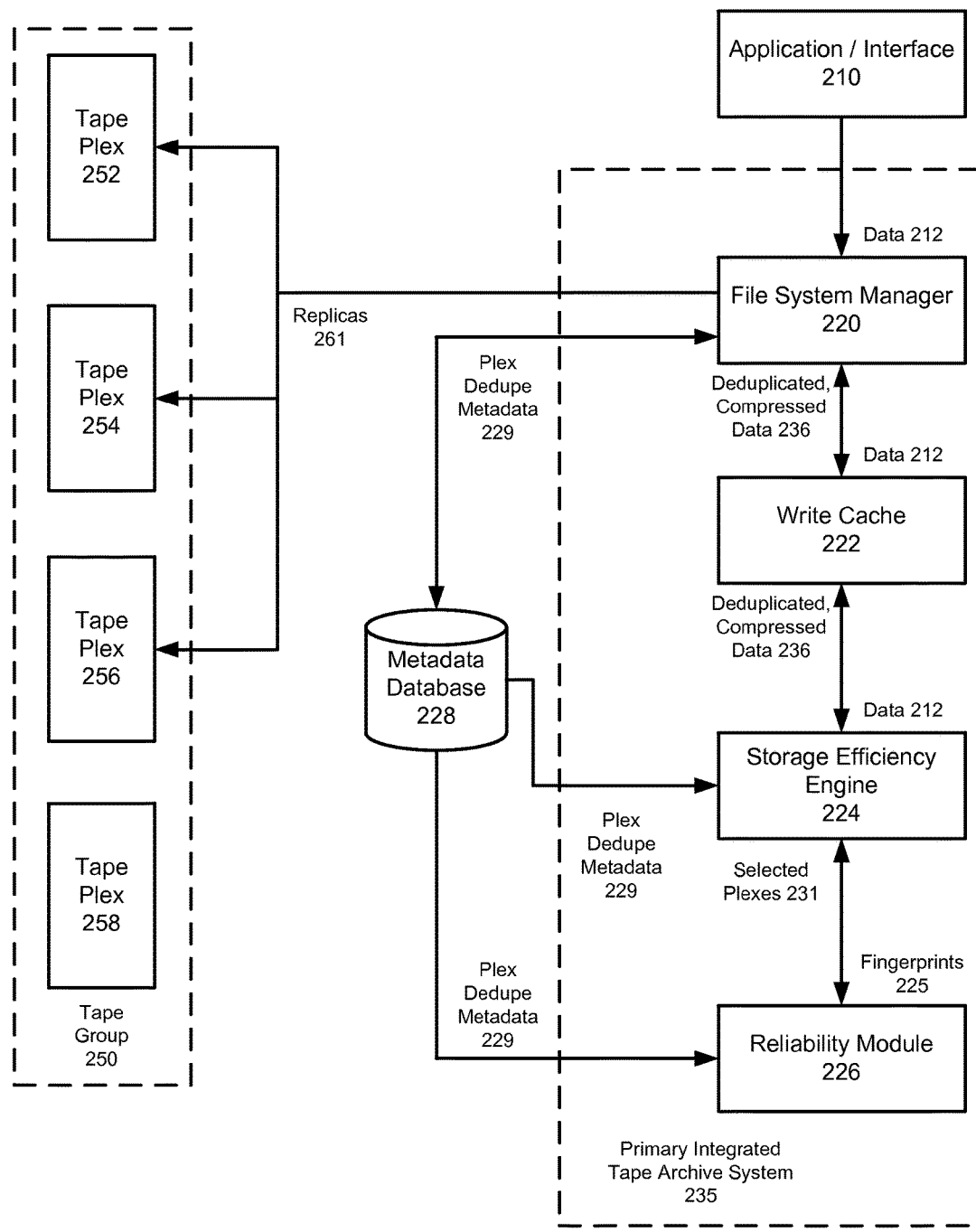
FIG. 2 illustrates example components for implementing restricted-deduplication assisted replication for reliability of data in tapes, in accordance with some aspects.

FIG. 2 illustrates example components for implementing restricted-deduplication assisted replication for reliability of data in tapes, in accordance with some aspects. Data 212 is received from clients through an application or interface 210. With reference to FIG. 1, data can be received from clients 110 and the application/interface 210 can correspond to the NFS or RESTful interface 120. In some aspects, application/interface 210 wraps the data 212 in a file or object write request that the file system manager 220 writes to write cache 222. File system manager 220 can add metadata for the write request to the metadata database 228. In addition, once the data 212 is cached, file system manager 220 can notify the client that the write is done although the data 212 is not yet written to tape. In some examples, write cache 222 is a persistent storage device such as a hard disk drive or solid state drive that retains data 212 even in the event of a power failure.

Although FIG. 2 illustrates specific components of a primary integrated tape archive system (PITA) 235, in some aspects, components can be combined or separated either within a storage server 130 or distributed across multiple computing devices. For example, write cache 222 can comprise multiple cache devices. In other examples, metadata database 228 can be stored within write cache 222 or on another server, such as a database server.

In one aspect, storage efficiency engine 224 waits until the write cache 222 is full or contains a threshold amount of data before beginning deduplication, which is a specialized compression technique for eliminating duplicate copies of repeating data. In the deduplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is dependent on the chunk size), the amount of data that must be stored or transferred can be greatly reduced.

Figure 6:
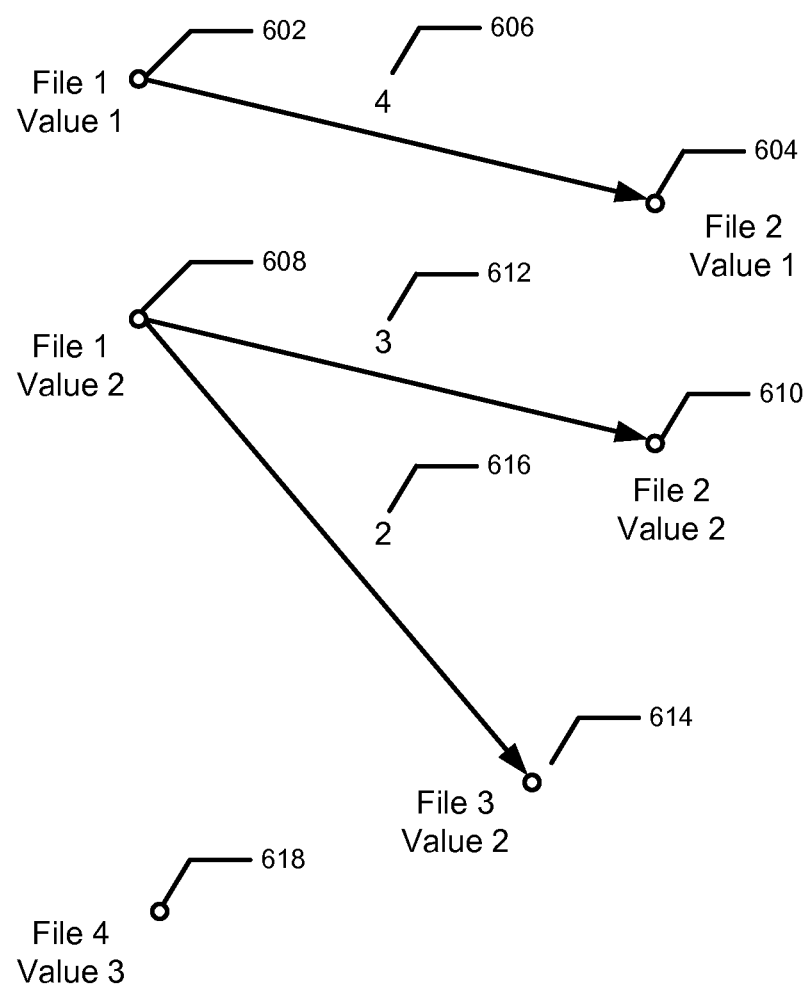
FIG. 6 is a directed acyclic graph illustrating identification of cliques, according to one aspect.

In some examples, storage efficiency engine 224 separates unique chunks of data from repeating data by forming cliques in a directed acyclic graph of the data 212. Nodes in the graph can represent files, objects, or subdivisions thereof. Hash values can be computed for each portion of the data within each node, and metadata can store correspondences between the hash values and one or more locations where the corresponding data is stored. Edges can be formed between the nodes in the graph where hash values of portions of the data in those nodes match the hash values of portions of the data in other nodes. Nodes that end up connected to one another form a clique, whereas nodes with no connections are deemed unique. Further details regarding an example of this process are illustrated in FIG. 6.

Hash values of the portions of data in each clique can comprise a fingerprint 225 for that clique, and these fingerprints 225 can be compared to the data already written to tape group 250 to determine on which tape plexes 252-258 to write replicas 261 of each clique. To compare the cliques to previously written data, metadata database 228 retains plex dedupe metadata 229, which includes block fingerprints of the previously written data. In one aspect, block fingerprints are a small hash or hashes of the data contained in a 512 KB tape block. For example, the block fingerprints can include the hashes for the cliques written to that 512 KB block.

Reliability module 226 can compare the hashes in the plex dedupe metadata 229 with the fingerprints 225 to select the top-K tape plexes 252-258 where the cliques should be stored to optimize storage efficiency. Here, K is the number of replicas 261 that PITA 235 maintains in order to preserve data 212. For example, if there are three replicas 261 divided between three plexes, two of the plexes can be lost before the data 212 is in danger. In some aspects, the selected plexes 231 are the plexes with the largest number of clique hash matches or the largest quantity of data with matching clique hashes.

Figure 5:
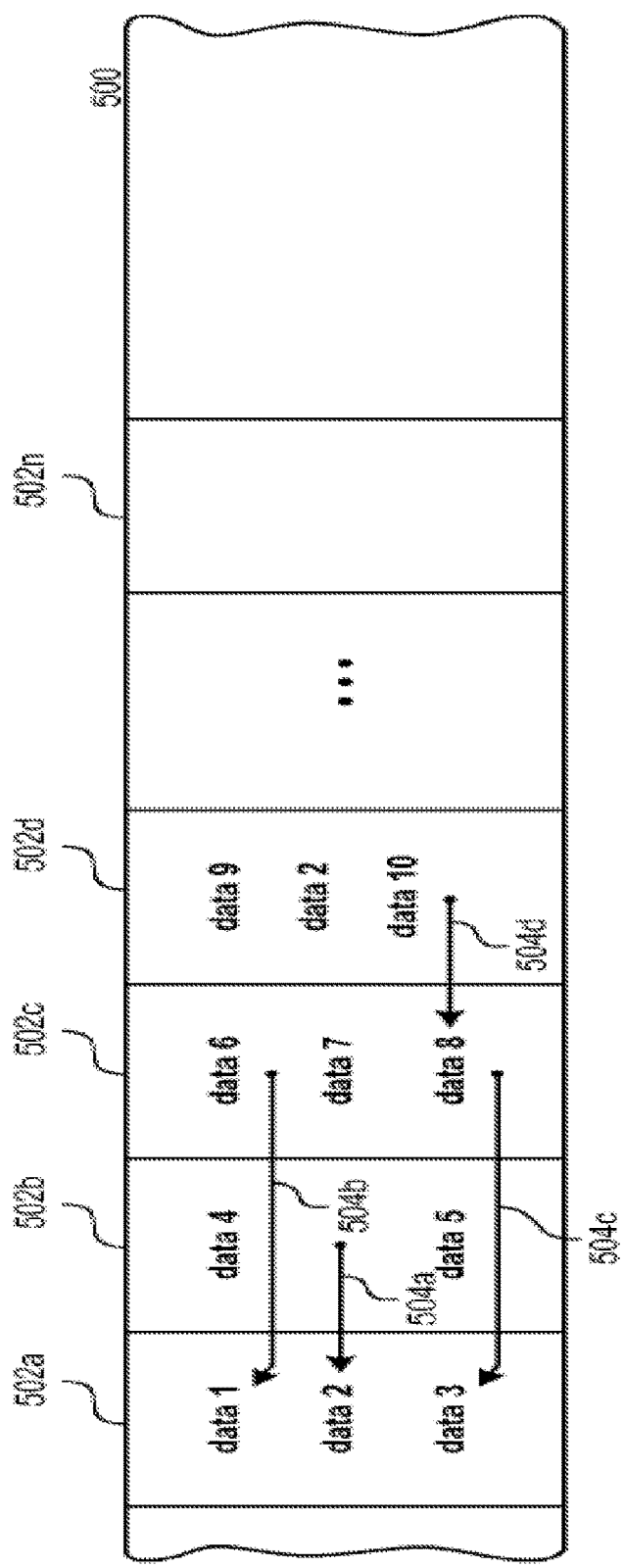
FIG. 5 is a schematic diagram illustrating a portion of a windowed storage element that stores deduplicated data.

Once the selected plexes 231 are identified, storage efficiency engine 224 deduplicates and compresses data 212 so that they can be written to tape. In some aspects, LTFS maintains a metadata index of cliques and location offsets in the tapes, which the storage efficiency engine 224 can use to deduplicate cliques in data 212 with the cliques stored on the selected plexes 231 by replacing duplicated cliques or portions of cliques with a reference to the location offset where the original unique data can be found. In a further aspect, tapes are arranged into windows, and data 212 is only deduplicated with the last window or last few windows written to on each tape. Further details regarding an example of windows are illustrated in FIG. 5.

Furthermore, storage efficiency engine 224 can compress the deduplicated data to yield greater storage efficiency. In some examples, tape drives can support built-in hardware compression algorithms, but these built-in algorithms do not yield good compression because they operate on blocks (e.g., 512 KB). In contrast, storage efficiency engine 224 can leverage the write cache 222 to perform bulk compression at larger block sizes. Post deduplication per-tape unique data is compressed and stored as one compression group (CG). A CG is the smallest unit of accessing data; that is, if a single block is to be read, the whole CG is uncompressed. Because the CG sizes can range from 1 MB to 64 MB in some examples, the block size for the compression algorithm should be large enough to yield better compression efficiency. In some aspects, compression is performed on deduplicated cliques that are present in the write cache 222, before flushing them to tapes, based on triggers such as the write cache 222 running out of free space or the system being taken offline.

As a result of unpacking CGs, parts of several other objects also reach the write cache 222—which can be useful to serve upcoming requests—or else they are evicted based on least recently used (LRU) cache eviction. If the object is already in the write cache 222, the request is served immediately. Otherwise, PITA 235 is aware of the approximate time when the object may be cached, and that information can be communicated to the client so that the client can wait or reissue the request at that time.

After deduplication and compression, file system manager 220 can plan the placement of the deduplicated, compressed data 236 in the tape group 250. In the example of FIG. 2, three replicas 261 of the deduplicated, compressed data 236 are written to tape plexes 252, 254, and 256, which represent the selected plexes 231. Metadata including the fingerprints 225 of the cliques and the placement of the replicas 261 can be stored in the metadata database 228 for use in future read and write operations to PITA 235.

Methodology

Figure 3:
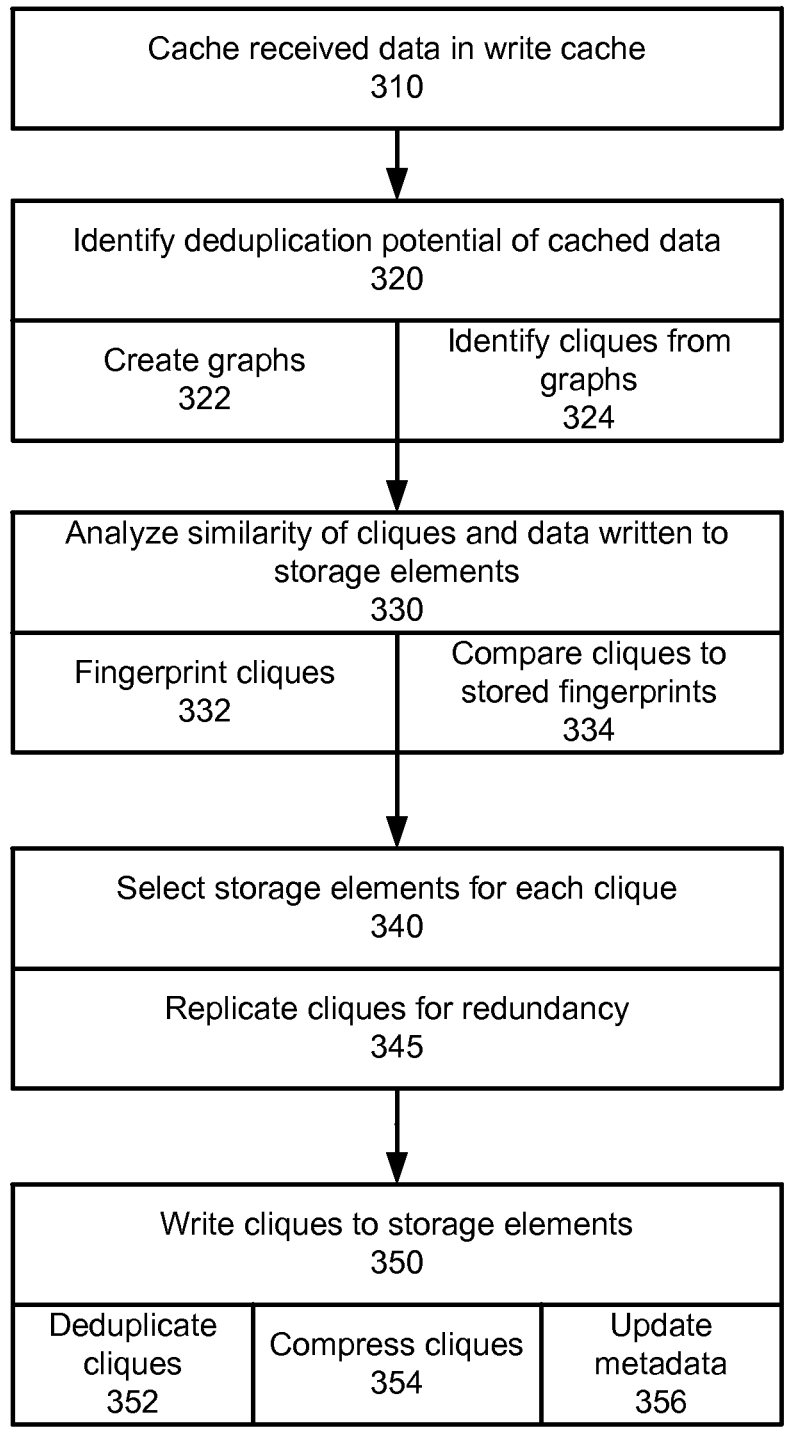
FIG. 3 illustrates an example method for selecting storage elements and deduplicating data received at a storage system.
Figure 4:
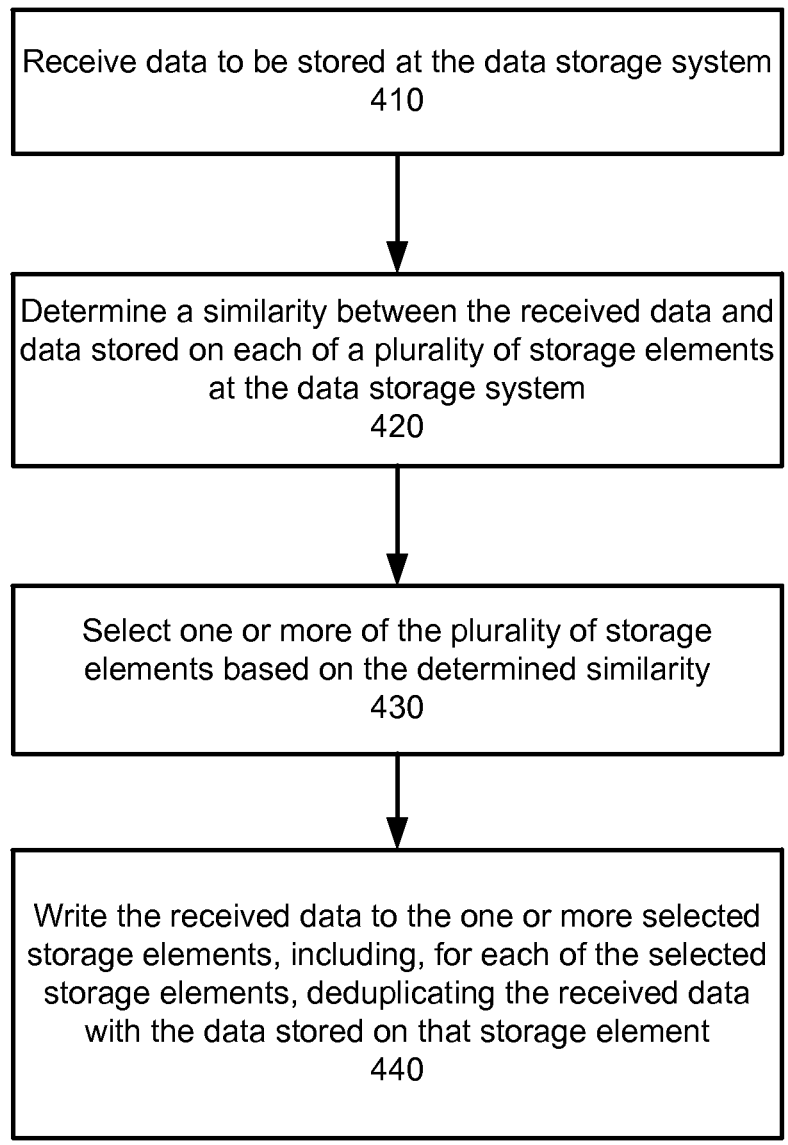
FIG. 4 illustrates an example method for restricted-deduplication assisted replication for reliability of data in tapes, in accordance with some aspects.

FIG. 3 illustrates an example method for selecting storage elements and deduplicating data received at a storage system. FIG. 4 illustrates an example method for restricted-deduplication assisted replication for reliability of data in tapes, in accordance with some aspects. While operations of examples of FIGS. 3 and 4 are described below as being performed by specific components, modules or systems of the data storage system 100, it will be appreciated that these operations need not necessarily be performed by the specific components and modules identified, and could be performed by a variety of components and modules, potentially distributed over a number of machines. Accordingly, references may be made to elements of data storage system 100 for the purpose of illustrating suitable components or elements for performing a step or sub step being described. Alternatively, at least certain ones of the variety of components and modules described in data storage system 100 can be arranged within a single hardware, software, or firmware component. It will also be appreciated that some of the steps of this method may be performed in parallel or in a different order than illustrated.

With reference to an example of FIG. 3, data received from clients are placed into a write cache in for example, a data storage system 100 as described with FIG. 1 (310). Data can include files and objects and be staged in the cache for a period of time, until the cache is full, or until other thresholds are met. In some examples, the cache is a persistent storage device such as a hard disk drive or solid state drive that can ensure data is not lost before being written to permanent storage on media elements. Accordingly, the cache can consist of multiple mirrored drives so that the loss of one drive does not result in data loss.

A primary integrated tape archive system 135 can identify the deduplication potential of the cached data (320). In the deduplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is dependent on the chunk size), the amount of data that must be stored or transferred can be greatly reduced.

In some examples, the deduplication potential is identified through creating directed acyclic graphs (322) and identifying cliques of data within those graphs (324). Nodes in the graphs can represent files, objects, or subdivisions thereof. Hash values can be computed for each portion of the data within each node, and metadata can store correspondences between the hash values and one or more locations where the corresponding data is stored. Edges can be formed between the nodes in the graph where hash values of portions of the data in those nodes match the hash values of portions of the data in other nodes. Nodes that end up connected to one another form a clique, whereas nodes with no connections are deemed unique.

The primary integrated tape archive system 135 can analyze the similarity of data in the cliques and data already written to storage elements (330). For example, hashed fingerprints can be taken for the cliques (332), and these fingerprints can be compared to block fingerprints stored for the data on the storage elements (334). To compare the cliques to previously written data, block fingerprints of the previously written data can be retained in a cache or database, and the fingerprints can be matched up to locate duplicate data. In one aspect, block fingerprints are a small hash or hashes of the data contained in a 512 KB tape block.

Based on the comparison between the fingerprints, the primary integrated tape archive system 135 selects storage elements for each clique (340). In one example, a sharing score is calculated for each of the tape plexes in a tape group. The sharing score can represent the amount of duplicate data shared between the cliques and the data already written to the tapes in that tape plex. In some examples, tapes are arranged into windows, and the cliques are only deduplicated with the last window or last few windows written to on each tape. As a result, sharing scores are calculated for the last window or last few windows. In addition, the cliques can be replicated for redundancy and each replica placed on a separate set of storage elements (345). For example, three replicas can be placed on the tape plexes with the three highest sharing scores.

Once the tape plexes for the replicas are selected, the primary integrated tape archive system 135 deduplicates and compresses data in the cliques so that they can be written to tape (350). In some aspects, LTFS maintains a metadata index of cliques and location offsets in the tapes, which can be used to deduplicate cliques in the data with the cliques stored on the selected plexes by replacing duplicated cliques or portions of cliques with a reference to the location offset where the original unique data can be found (352). Furthermore, the deduplicated data in the cliques can be compressed to yield greater storage efficiency (354).

Once replicas are written, metadata including the fingerprints of the cliques and the placement of the replicas can be updated and stored in a cache or database for use in future read and write operations to the tape library (356).

FIG. 4 illustrates an example method for restricted-deduplication assisted replication for reliability of data in tapes. In some aspects, data to be stored at the data storage system 100 is received (410). Similarity between the received data and data stored on each of a plurality of storage elements at the data storage system 100 can be determined (420), and one or more of a plurality of storage elements selected based on the determined similarity (430). The received data can then be written to the one or more selected storage element, including, for each of the selected storage element, deduplicating the received data with the data stored on that storage element (440).

FIG. 5 is a schematic diagram illustrating a portion of a windowed storage element that stores deduplicated data. In one example, a media element 500 is a tape cartridge divided into multiple segments, or partitions. A deduplication process, such as described with a primary integrated tape archive system 135, can be applied to data stored in a specified number of these segments. This specified number of segments can be referred to as a "window." In the example illustrated in FIG. 5, deduplication is applied to a three-segment window, meaning that any one segment may contain references to the previous three segments. In other examples, deduplication can be applied across multiple windows themselves. Segment 502a stores data 1, data 2, and data 3. Segment 502b stores data 4, a reference 504a to data 2, and data 5. Segment 502c stores data 6, a reference 504b to data 2, data 7, data 8, and a reference 504c to data 3. Segment 502d stores data 9, data 2, data 10, and a reference 504d to data 8. Because segment 502d is outside of three segments from 502a, and a value of three is specified for the size of a window, data 2 is duplicated in 502d even though it was previously stored in segment 502a. Thus, when reading data sequentially from the media element, the shoeshine effect can be avoided because the media element 500 does not have to be rewound more than three segments. In some examples, a cache can store up to three segments of data so that the tape cartridge does not need to be rewound to read the deduplicated data. By reducing the shoeshine effect, latency can be reduced and throughput can be increased.

The media element 500 illustrated in FIG. 5 is a simple representation with contents and organization designed for ease of understanding. Actual data structures and layouts used in tape cartridges to store this information may differ from what is illustrated, in that they, for example, may be organized in a different manner, may contain more or less information than shown, and may be compressed and/or encrypted.

FIG. 6 is a directed acyclic graph illustrating identification of cliques, according to one aspect. A clique is a grouping of related data. A node (or "vertex") 602 corresponds to hash value 2 of file 1. A hash value can correspond to a portion of file 1. The storage system may store correspondences between hash values and one or more locations where corresponding data is stored. Although files are illustrated and discussed, the technology can also be applied to object based file systems that store objects instead of or in addition to files. A node 604 corresponds to hash value 1 of file 2. The edge from node 602 to node 604 has a weight 606 of 4. This weight can indicate that file 2 has four references to hash value 1 of file 1. A node 608 corresponds to hash value 2 of file 1. A node 610 corresponds to hash value 2 of file 2. A node 614 corresponds to hash value 2 of file 3. The edge from node 608 to node 610 has a weight 612 of 3, meaning that hash value 2 is identical to three portions of file 2 and so has three references. The edge from node 608 to node 614 has a weight 616 of 2. Node 618 corresponds to hash value 3 of file 4. The three disconnected sub-graphs each represent a "clique." In some examples, each clique can be deduplicated and stored separately on a different media element because reading a portion of a file in one clique does not require reading data from a different clique. In some aspects, the directed acyclic graph can also be pruned to remove edges with low weights.

Although directed acyclic graphs with weighted edges are illustrated and described herein, other techniques can also be employed to determine cliques. For example, transitive closures, strongly connected components, and/or other graph-vertex connecting techniques can be used instead.

Computer System

Figure 7:
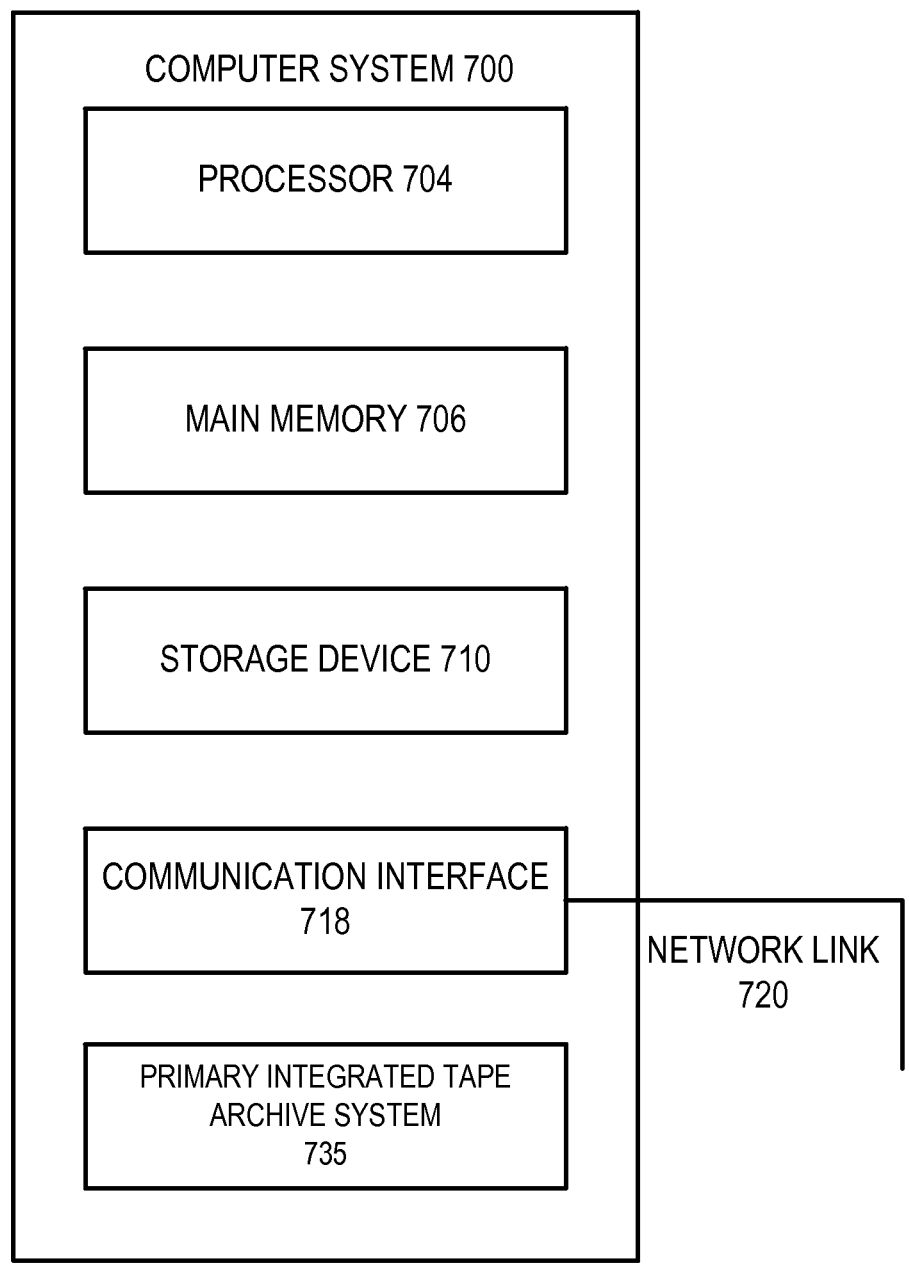
FIG. 7 is a block diagram that illustrates a computer system upon which aspects described herein may be implemented.

FIG. 7 is a block diagram that illustrates a computer system upon which aspects described herein may be implemented. For example, in the context of FIG. 1, data storage system 100 may be implemented using one or more servers such as described by FIG. 7.

In an aspect, computer system 700 includes processor 704, memory 706 (including non-transitory memory), storage device 710, communication interface 718, and a primary integrated tape archive system 735. Computer system 700 includes at least one processor 704 for processing information. Computer system 700 also includes the main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 may also include a read only memory (ROM) or other static storage device for storing static information and instructions for processor 704. The storage device 710, such as a magnetic disk or optical disk, is provided for storing information and instructions. The communication interface 718 may enable the computer system 700 to communicate with one or more networks through use of the network link 720 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 700 for implementing the techniques described herein. According to one aspect, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A computing device comprising:
a memory resource to store instructions;
one or more processors using the instructions stored in the memory resource to:
receive data to be stored at a data storage system;
determine similarities between the received data and data stored on each of a plurality of storage elements at the data storage system;
select a first storage element and a second storage element of the plurality of storage elements based on the first storage element having a highest similarity and the second storage element having a next highest similarity;
write the received data to the first storage element, wherein the received data is deduplicated with data stored on the first storage element; and
write a replica of the received data to the second storage element, wherein the replica is deduplicated with data stored on the second storage element.

2. The computing device of claim 1, comprising further instructions used by the one or more processors to:
identify patterns of bytes within the received data;
separate the received data into one or more subsets based on the identified patterns of bytes; and
for each of the one or more subsets:
determine a subset similarity between the subset and data stored on each of the plurality of storage elements at the data storage system;
select one or more of the plurality of storage elements based on the subset similarity; and
write the subset to the one or more selected storage elements, including, for each of the selected storage elements, deduplicating the subset with the data stored on that storage element.

3. The computing device of claim 2, comprising further instructions used by the one or more processors to:
determine the subset similarity by (i) applying a hashing algorithm to the subset to generate a subset fingerprint, and (ii) comparing the subset fingerprint to stored fingerprints corresponding to the data stored on each of the plurality of storage elements; and
store the generated subset fingerprints in association with the selected storage elements.

4. The computing device of claim 1, wherein the data stored on each of the plurality of storage elements are divided into windows.

5. The computing device of claim 4, wherein the data is divided into the windows based on how recently the data was stored.

6. The computing device of claim 4, wherein similarity is determined between the received data and data from a predetermined number of recent windows on each of the plurality of storage elements.

7. The computing device of claim 1, wherein each of the plurality of storage elements comprises multiple linear storage devices.

8. A method of writing data in a data storage system, the method being implemented by one or more processors and comprising:
    receiving data to be stored at the data storage system;
    determining similarities between the received data and data stored on each of a plurality of storage elements at the data storage system;
    selecting a first storage element and a second storage element of the plurality of storage elements based on the first storage element having a highest similarity and the second storage element having a next highest similarity;
    writing the received data to the first storage element, wherein the received data is deduplicated with data stored on the first storage element; and
    writing a replica of the received data to the second storage element, wherein the replica is deduplicated with data stored on the second storage element.

9. The method of claim 8, further comprising:
    identifying patterns of bytes within the received data;
    separating the received data into one or more subsets based on the identified patterns of bytes; and
    for each of the one or more subsets:
        determining a subset similarity between the subset and data stored on each of the plurality of storage elements at the data storage system;
        selecting one or more of the plurality of storage elements based on the subset similarity; and
        writing the subset to the one or more selected storage elements, including, for each of the selected storage elements, deduplicating the subset with the data stored on that storage element.

10. The method of claim 9, further comprising:
    determining the subset similarity by (i) applying a hashing algorithm to the subset to generate a subset fingerprint, and (ii) comparing the subset fingerprint to stored fingerprints corresponding to the data stored on each of the plurality of storage elements; and
    storing the generated subset fingerprints in association with the selected storage elements.

11. The method of claim 8, wherein the data stored on each of the plurality of storage elements are divided into windows.

12. The method of claim 11, wherein the data is divided into the windows based on how recently the data was stored.

13. The method of claim 11, wherein similarity is determined between the received data and data from a predetermined number of recent windows on each of the plurality of storage elements.

14. The method of claim 8, wherein each of the plurality of storage elements comprises multiple linear storage devices.

15. A non-transitory computer-readable medium that stores instructions, executable by one or more processors, to cause the one or more processors to perform operations that comprise:
    receiving data to be stored at a data storage system;
    determining similarities between the received data and data stored on each of a plurality of storage elements at the data storage system;
    selecting a first storage element and a second storage element of the plurality of storage elements based on the first storage element having a highest similarity and the second storage element having a next highest similarity;
    writing the received data to the first storage element, wherein the received data is deduplicated with data stored on the first storage element; and
    writing a replica of the received data to the second storage element, wherein the replica is deduplicated with data stored on the second storage element.

16. The non-transitory computer-readable medium of claim 15, storing further instructions used by the one or more processors to perform operations that comprise:
    identifying patterns of bytes within the received data;
    separating the received data into one or more subsets based on the identified patterns of bytes; and
    for each of the one or more subsets:
        determining a subset similarity between the subset and data stored on each of the plurality of storage elements at the data storage system;
        selecting one or more of the plurality of storage elements based on the subset similarity; and
        writing the subset to the one or more selected storage elements, including, for each of the selected storage elements, deduplicating the subset with the data stored on that storage element.

17. The non-transitory computer-readable medium of claim 16, storing further instructions used by the one or more processors to perform operations that comprise:
    determining the subset similarity by (i) applying a hashing algorithm to the subset to generate a subset fingerprint, and (ii) comparing the subset fingerprint to stored fingerprints corresponding to the data stored on each of the plurality of storage elements; and
    storing the generated subset fingerprints in association with the selected storage elements.

18. The non-transitory computer-readable medium of claim 15, wherein the data stored on each of the plurality of storage elements are divided into windows.

19. The non-transitory computer-readable medium of claim 18, wherein the data is divided into the windows based on how recently the data was stored.

20. The non-transitory computer-readable medium of claim 18, wherein similarity is only determined between the received data and data from a predetermined number of recent windows on each of the plurality of storage elements.

* * * * *